(12) United States Patent
Chao

(10) Patent No.: US 6,292,310 B1
(45) Date of Patent: Sep. 18, 2001

(54) DYNAMIC LIGHT BEAM DEFLECTOR

(75) Inventor: Yong-Sheng Chao, Storrs, CT (US)

(73) Assignee: Advanced Optical Technologies, Inc., E. Hartford, CT (US)

( * ) Notice: Subject to any disclaimer, the term of this patent is extended or adjusted under 35 U.S.C. 154(b) by 0 days.

(21) Appl. No.: 09/812,767

(22) Filed: Mar. 20, 2001

Related U.S. Application Data

(60) Division of application No. 09/737,506, filed on Dec. 15, 2000, which is a continuation-in-part of application No. 09/503,828, filed on Feb. 15, 2000, now Pat. No. 6,204,955, which is a continuation-in-part of application No. 09/350,388, filed on Jul. 9, 1999, now abandoned.

(51) Int. Cl.[7] .............................. G02B 7/02; G02B 26/08
(52) U.S. Cl. ......................... 359/813; 359/824; 359/298
(58) Field of Search ................................... 359/813, 814, 359/824, 298, 318, 209, 210, 196

(56) References Cited

U.S. PATENT DOCUMENTS

| 5,917,647 | * | 6/1999 | Yoon | 359/298 |
| 6,144,478 | * | 11/2000 | Nowal et al. | 359/210 |
| 6,204,955 | * | 3/2001 | Chao et al. | 359/298 |
| 6,222,302 | * | 4/2001 | Imada et al. | 310/321 |

* cited by examiner

Primary Examiner—Georgia Epps
Assistant Examiner—Saeed Seyrafi
(74) Attorney, Agent, or Firm—Morse, Altman & Martin

(57) ABSTRACT

A light beam deflector comprising an initial dynamic beam deflector and a beam deflection amplifier. The initial deflector can be any currently available device for providing a small angle deflection. The beam deflection amplifier has two embodiments: a Keplerian telescope lens first stage and a negative lens system second stage, and a Galilean telescope lens first stage and a negative lens system second stage.

5 Claims, 3 Drawing Sheets

DYNAMIC LIGHT BEAM DEFLECTOR

CROSS-REFERENCES TO RELATED APPLICATIONS

The present application is a divisional application of application Ser. No. 09/737,506, dated Dec. 15, 2000, for PIEZOELECTRIC LIGHT BEAM DEFLECTOR, in the names of Yong-Sheng Chao and Ying Zhao, which is a continuation-in-part application of application Ser. No. 09/503,828, dated Feb. 15, 2000, now U.S. Pat. No. 6,204,955 for APPARATUS FOR DYNAMIC CONTROL OF LIGHT DIRECTION IN A BROAD FIELD OF VIEW in the names of Yong-Sheng Chao and Ying Zhao, which is a continuation-in-part application of application Ser. No. 09/350,388, dated Jul. 9, 1999, which is now abandoned, for APPARATUS FOR DYNAMIC CONTROL OF LIGHT DIRECTION IN A BROAD FIELD OF VIEW in the names of Yong-Sheng Chao and Ying Zhao, now abandoned.

STATEMENT REGARDING FEDERALLY SPONSORED RESEARCH OR DEVELOPMENT

Not Applicable

BACKGROUND OF THE INVENTION

1. Field of the Invention

This invention relates generally to light direction control, and more particularly, to techniques for the amplification of the deflection of an initially deflected light beam.

2. Description of the Related Art

Dynamic control of light beam propagation direction is a fundamental technique in optics. Direct applications include projection displays, entertainment, advertisement, laser printers, laser detection systems, laser scanning, optical communications, laser machining, etc.

Currently, there are four significant light deflection methods: electromechanical, acoustooptic, electrooptic, and electrically-controlled light grating methods. Of these four methods, electromechanical methods are used most frequently in commercial application products. Electromechanical methods use a rotating mirror or rotating prism as a mechanical device for changing light direction. These devices have a number of limitations due to the intrinsic nature of mechanical movement on a macroscopic scale. For example, they are relatively slow. Generally, it takes milliseconds to change the light beam from one direction to another direction. Also, such systems are susceptible to interference from mechanical vibration.

The other three light deflection methods contain no mechanical moving parts at macroscopic scale. However, the maximum deflection angle range is often a significant limiting factor to their performance. For example, the maximum deflection angle that the fully electronic control methods can provide is generally less than $\pm 3°$. The small deflection angle essentially excludes electronic control methods from almost all important practical applications. Electromechanically-controlled rotating mirror devices can provide moderately larger deflection angle. The maximum deflection angle for two-dimensional electromechanically-controlled rotating mirrors is usually much less than $\pm 30°$, limited by the geometry of mechanical parts. And, in many important light scanning applications, such as laser radar systems, a much larger scanning angle range is often required. Thus, even the maximum deflection angle range of the electromechanical systems may still be insufficient.

In the prior art, light beam expanders are used for moderately increasing the deflection angle within a small angle range. There are two types of beam expander lens systems: Galileo-type and Kepler-type systems, in close analogy to the Galileo-type simple telescope and the Kepler-type simple telescope systems. A "simple telescope system" means that the telescope is built using only single-element lenses. A single-element lens can be a singlet, doublet, or triplet lens with conventional correction of aberrations. A single-element lens is different from a compound lens system, which is a combination of a number of lens elements. The Galileo-type beam expander uses a convex and a concave lens, and can only provide a small increase in the deflection angle, for example, less than a tripling of the initial deflection angle.

In the Kepler-type simple telescope systems, a beam expander is used in the reverse direction, increasing the deflection angle. The beam expander system uses two single-element lenses: a large lens and a small lens. For a collimated light beam with an incident angle $\theta_0$, the following relationships hold true: $\tan \theta_0 = (d/2)/f_1$ and $\tan \theta = (d/2)/f_2$, where d is the diameter of the small lens, $f_1$ is the focal length of the large lens, and $f_2$ is the focal length of the small lens. Superficially, it might be deduced from the above relationships that $\tan \alpha / \tan \alpha_0 = f_1/f_2$, and it appears that as long as $f1/f_2$ is sufficiently large, the deflection angle can be increased to a large value. In practice, however, this is not true. The above relationships depend on a practical restriction before the transformation is allowed. The maximum deflection angle allowed by the small single-element lens is rather small. Note that in prior art beam expanders, the small lens is only a single-element lens. And the aperture of a simple lens is generally rather limited. Only a small central area of the simple lens can only be utilized to ensure appropriate focusing quality. If the area of the lens to be used is too large, the focusing quality would be significantly degraded. The f-number for a single-element lens must be at least 2, that is, $f \geq 2d$. Thus, the largest deflection angle value $\theta$ for the output light beam in the prior art beam expander is approximately $\theta_{max} \leq \arctan[(d/2)/f] = \arctan 0.25 = 14°$. And when the single-element lens f-number is 3, that is, $f \geq 3d$, then $\theta_{max} \leq \arctan 0.17 = 9°$.

Note that actual maximum deflection angle value of the published data for acousto-optic deflectors with a beam expander is $\theta_{max} \leq 10°$.

BRIEF SUMMARY OF THE INVENTION

An object of the present invention is to provide a geometric optical lens system capable of providing deflection amplification to a light beam that has been initially deflected by a small angle.

A light beam deflector comprises an initial dynamic beam deflector, which imparts a small initial deflection $\theta_0$, and a beam deflection amplifier, which increases the initial small deflection $\theta_0$ to an output deflection $\theta$. The light beam deflector is for use with a light source, such as a laser, light-emitting diode, or optical fiber, and conventional optics to appropriately modify the light output to meet the requirements of the initial beam deflector.

The beam deflection amplifier of the present invention multiplies the initial deflection angle $\theta_0$ by an amplification factor A to result in a full deflection angle $\theta_0 A = \theta$, where $A > 1$. There are two preferred embodiments. The first embodiment comprises a Keplerian telescope lens system first stage and a negative lens system second stage. The most important criteria for achieving a large output deflection angle is to make sure that the first stage output light beam always angles away from the optical axis after crossing the optical axis between the two stages.

The second embodiment comprises a Galilean telescope lens system first stage and a negative lens system second stage. The most important criteria for achieving a large output deflection angle is to make sure that the first stage output light beam always angles away from the optical axis, without crossing the optical axis between the two stages.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
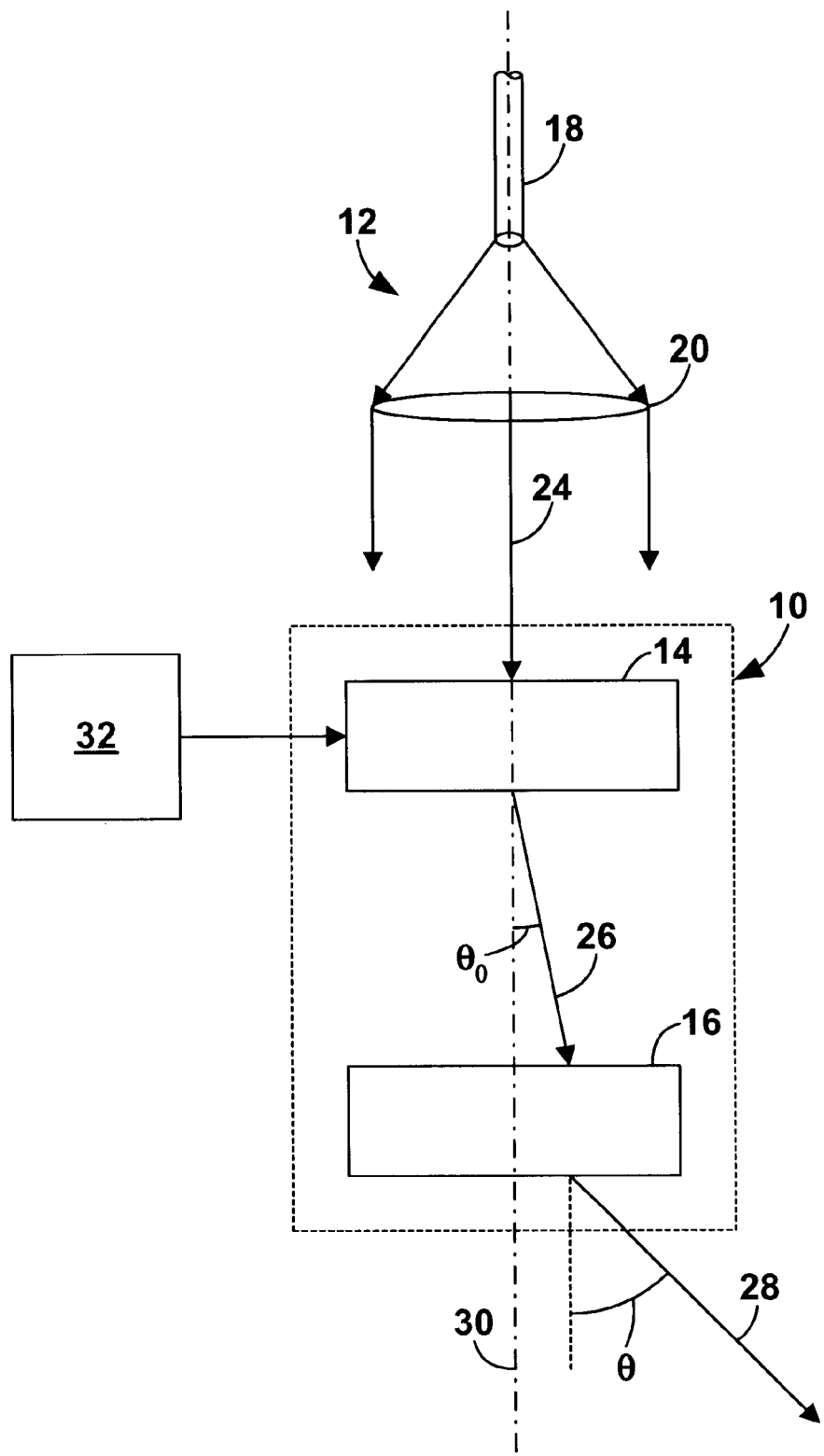
FIG. 1 is a block diagram of a basic light beam deflector in which the amplifier of the present invention is used.

A basic light beam deflector 10, a block version of which is shown in FIG. 1, comprises an initial dynamic beam deflector 14 and a beam deflection amplifier 16 based on classical geometric optics that provides an output light beam with an increased deflection angle. In the remainder of this specification, the beam deflection amplifier 16 based on classical geometric optics is denoted simply as the "beam deflection amplifier" or simply "deflection amplifier."

The present invention 10 is intended for use with a light source 12 that comprises a light emitting device 18, such as a laser, light-emitting diode, lamp, or optical fiber as a light source, and a conventional optical system 20 to appropriately modify the light emitting device output to meet the specific requirements of the initial beam deflector 14 for optimal performance, as discussed below. The techniques used in the light source 12 are standard and well-established.

The beam 24 from the light source 12 passes through the initial beam deflector 14, undergoing a small initial deflection $\theta_0$, as measured between the light beam direction and the optical axis 30 of the system. The initial beam deflector 14 is controlled by an external device 23. The initially deflected beam 26 then passes through the deflection amplifier 16, which increases the initial small deflection $\theta_0$ to an output deflection $\theta$, as measured between the direction of the output light beam 28 and the optical axis 30 of the system.

A. The Initial Beam Deflector 14

The initial dynamic beam deflector 14 can be any currently available device for providing a small angle deflection, and the type of initial dynamic beam deflector 14 determines the required parameters of the initial light beam 24. As indicated above, there are currently four types of dynamic light beam deflectors: electromechanically-controlled deflectors, acoustooptic deflectors, electrooptic deflectors, and electronically-controlled grating devices. The initial dynamic beam deflector 14 can be either a one-dimensional or two-dimensional deflector.

An electromechanically-controlled deflector uses a rotating mirror or prism. It requires that the size of the initial beam be small enough to be compatible with the size of the mirror. It also requires that the initial beam have a well-defined direction, preferably collimated. The light wavelength can be any that is within the optical wavelength range of the mirror or prism. Electromechanically-controlled rotating mirrors and prisms can provide a moderately large angular coverage. For example, a typical two-dimensional galvano-scanner has a maximum excursion of ±30°. The main issue with electromechanical deflectors is their speed of operation.

An acoustooptic deflector comprises a transparent deflector medium, an ultrasonic wave transducer, and a radio frequency (RF) signal source to control the ultrasonic wave. In the deflection medium, an intense acoustic wave creates a density pattern similar to a moving grating. After a laser beam, the preferred light source, passes through the density grating, the deflection angle due to diffraction is $\sin\theta_0 \cong \theta_0 = \lambda/(2\Lambda)$, where $\lambda$ is the wavelength of the light and $\Lambda$ is the wavelength of the sonic wave. Because the wavelength of the sonic wave is always much larger than that of the light wave, the deflection angle is always rather small. In an acoustooptic device, by tuning the RF signal frequency, the sonic wavelength $\Lambda$ is changed, and the laser beam can be deflected to different directions. Because there are no moving parts, the response is fast, usually on the order of 10 microseconds.

Acoustooptic deflectors require a monochromatic and well-collimated initial light beam. So the only practical light source is a laser. The wavelength can range from ultraviolet (UV) to infrared (IR). Beam size also affects the performance parameters, such as angular resolution and response time. Beam size of an acoustooptic deflector can vary, for example, from 1 mm×1 mm to 10 cm×10 cm. In many cases, the light beam directly emitted from a laser source has a beam size narrower than that required by the acoustooptical deflector. In those cases, a standard lens system is often used for appropriately enlarging the beam size. The maximum deflection angle of an acoustooptic deflector is usually less than ±2°.

In the electrooptic deflector, the index of refraction of the light transmission medium is affected by a high intensity electric field. When the light beam propagates from one medium to another, the direction of the light beam is deflected from one direction to another with the change of the electric field intensity. The response time of electrooptic deflectors can be in the nanosecond range. However, because the electrooptic coefficient is low, the deflection angle is small even for the electric field as high as between kilovolts to tens of kilovolts applied on a medium plate less than 1 mm thick. The feasible deflection angle of the electrooptic deflector is much less than ±2°. Unlike acoustooptic deflectors, electrooptic deflectors do not require that the light beam to be monochromatic. However, like the acoustooptic deflectors, the beam size affects the angular divergence of the output light beam. The larger the beam size, the less the output light beam divergence.

There are two types of electrically-controlled grating devices currently available: microelectromechanical (MEM) light grating valves (LGV) and liquid crystal gratings. The direction and intensity of the diffracted light beam can be controlled by electrical signals applied on the grating lines. The diffraction direction can only be changed in discrete steps. These devices require a monochromatic and well-collimated initial light beam. The maximum deflection angle is determined by the minimum line pitch that can be fabricated between grates. Currently, for example, the minimum line pitch d is about 5 μm. Thus, according to diffraction law, $\sin\theta_0=\lambda/d$, for $\lambda=0.5$ μm, the maximum deflection angle would be about 5° in discrete steps.

B. The Light Beam Deflection Amplifier 16

The light beam deflection amplifier 16 multiplies the small initial deflection angle $\theta_0$ by an amplification factor A to result in a full deflection angle $\theta=\theta_0 A$, where A>1. Typically, A will be constant for all values of $\theta_0$. However, the present invention contemplates that A may not be constant, but may be a function of the angle $\theta_0$ of the beam incident on the beam deflection amplifier 16. For example, A can be written as $A=A_1+A_2\times f(\theta_0)$, where the $A_1$ and $A_2$ are constants with the relation $A_1>>A_2$, and $f(\theta_0)$ is a slowly changing function of $\theta_0$.

There are two preferred embodiments for the beam deflection amplifier 16.

1. First Beam Deflection Amplifier Embodiment

Figure 2:
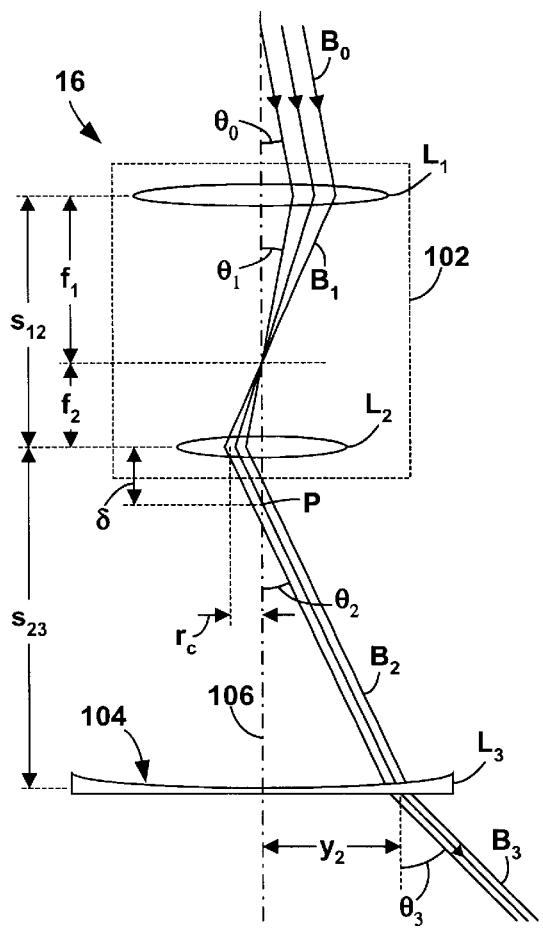
FIG. 2 is a schematic diagram of the first embodiment of the beam deflection amplifier.

The first preferred embodiment of the beam deflection amplifier 16 comprises two stages of amplification, as shown in FIG. 2. The first amplification stage 102 is essentially a Keplerian telescope lens system, which comprises a pair of positive lenses $L_1$ and $L_2$, that outputs a "pre-deflected" light beam that has a "preamplified" deflection angle. The second amplification stage 104 is a negative lens system $L_3$ optically coupled to the first amplification stage 102. The most important criteria of the present invention for achieving a large output deflection angle at the output of the second amplification stage 104 is to make sure that the light beam $B_2$ always angles away from the optical axis 106 after crossing the optical axis 106 at point P. A characteristic feature of the lens system structure for the second stage amplification of the first embodiment is that the center line of the light beam $B_2$ crosses the optical axis 106 only once after leaving the surface of lens $L_2$.

The beam deflection amplifier 16 must simultaneously fulfill the following three requirements: (1) if a collimated beam enters the deflection amplifier, a collimated beam must exit the deflection amplifier; (2) the deflection angle of the output beam must be larger than the non-zero deflection angle of the input beam; and (3) the output beam must have good beam quality. In quantitative terms, the aberration of the output beam must be correctable to an acceptable value. The following is a description of how these requirements are fulfilled for each amplification stage.

As indicated above, the first amplification stage 102 is a Keplerian telescope lens system, which comprises essentially a pair of positive lenses, lens $L_1$ having a focal length $f_1$ and lens $L_2$ having a focal length $f_2$, where $f_1>f_2>0$. The two lenses are separated by a distance $s_{12}$ such that $f_1+f_2=s_{12}$. According to thin lens formulae, the focal length of the Keplerian telescope lens system is $f_{12}=f_1\times f_2/(f_1+f_2-s_{12})$. Since $(f_1+f_2-s_{12})=0$, $f_{12}$ is infinite. Thus, the first amplification stage 102 meets the first two requirements: when a collimated light beam Bo with a small deflection angle $\theta_0$ relative to the optical axis 106 is incident on lens $L_1$, the light beam $B_2$ from lens $L_2$ will also be collimated and will have a deflection angle $\theta_2$ relative to the optical axis 106 governed by the relationship $\tan(\theta_2/\theta_1)\cong\theta_2/\theta_1=f_1/f_2>1$. This is an established method for increasing the deflection angle of a light beam. However, two constraints on the Keplerian lens system limit the maximum output deflection angle. First, the amplification factor $A_{12}=f_1/f_2$ requires that $f_1>>f_2$. Generally this means that $f_1$ is on the order of 5 to 10 times larger than $f_2$. However, this ratio is limited by how large $L_1$ can be made and how small $L_2$ can be made.

And since the focal length $f_1$ is closely related to the curvature radius $r_1$ of lens $L_1$, the size of lens $L_2$ must be small. Additionally, in order keep aberrations within an acceptable range, the light beam $B_0$ must impinge upon only a small central area of $L_1$ with a radius value $r_c<<r_1$. Otherwise, the aberrations would be too large.

Note that it may be possible to improve this factor to some extent by inserting an additional lens called a "field lens" at the common focal plane of lens system $L_1+L_2$. The description of this standard procedure can be found in optics textbooks.

The second constraint is that the output light beam $B_2$ from lens $L_2$ must always cross the optical axis 106. At the maximum deflection angle, the output light beam must be bent from the edge of the central area at radius $r_c$ to the optic axis. The output deflection angle $\tan(\theta_2)\leq r_c/\delta$, where $r_c$ cannot be large and $\delta$ cannot be very small. Usually, the maximum deflection angle for a Keplerian lens system is only about 10° if a reasonable output light beam quality is required. Reducing the value $\delta$ and increasing the value $r_c$ tend to exponentially increase aberration, drastically degrading light beam quality.

In prior art, there is no effective procedure for improving this constraint. The only improvement in the prior art is the use of a compound positive lens to replace the single positive lens $L_2$. However, the improvement is very much limited because the fundamental lens aberration relationship determines that the aberration increases at least as the third power of the value of ratio $(r_c/\delta)$. In order to increase the maximum output angle $\theta_2$ (and $\tan(\theta_2)$), the ratio $(r_c/\delta)$ has to be increased. But a slight increase of the ratio $(r_c/\delta)$ leads to a drastic increase in the aberration and degradation of the beam quality. On the other hand, it should be mentioned that, in reality, the small value for the maximum deflection angle is not a serious problem for the Keplerian lens system when used as a telescope, because for the observation of a remote scene through human eyes does not require a very large deflection angle. However, for many modern optical systems, such as for use with a wide-angle beam deflector, the small maximum output deflection angle is often unacceptable. To solve this problem, the present invention introduces a second stage of amplification.

The basic approach to the second stage of amplification is that, after the beam $B_2$ has crossed the optical axis 106 at the point P, it is always angling away from optical axis 106, so beam $B_2$ does not cross the optical axis 106 more than once.

For quantitative analysis, note that, because $f_1>>f_2$, the output light beam $B_2$ from lens $L_2$ is narrow. Because it is narrow, light beam $B_2$ can be represented by its center ray emitted from point P. A negative lens $L_3$ with a focal length $f_3<0$ and located at distance $s_{23}$ from $L_2$ tends to angle the beam $B_3$ outwardly by an additional slope of $\Delta u_{23}=u_3-u_2=\tan(\theta_3)-\tan(\theta_2)$, where u is the slope of the corresponding beam relative to the optical axis 106. As shown in FIG. 2, as a first order approximation, according to paraxial ray tracing theory, $\Delta u_{23}=\tan(\theta_3)-\tan(\theta_2)=y_2/f_3$, where $y_2$ is the height of the beam $B_2$. Since $y_2=u_3\times s_{23}$, the amplification factor of the second stage $A_3=s_{23}/f_3$. As long as the distance $s_{23}$ is sufficiently large and lens $L_3$ is constructed with an appropriately large size, the amplification factor can range between approximately 2 and 10 and the output deflection angle can be as large as 90°.

In addition to the requirement that the lens system provide amplification, it is also necessary that the lens system output a beam with good beam quality. If the beam $B_2$ from lens $L_2$ is a collimated beam, the output beam $B_3$ will be divergent due to the negative lens $L_3$. By appropriately choosing the parameters $f_2$, $f_3$, $s_{23}$, and fine-tuning the distance $s_{12}$, all the required performance parameters can be consistently achieved. To show that this is true, consider lens pair $L_3+L_2$ and look into lens $L_3$ in the reverse direction, that is, from the output. When using thin lens approximations, the combined back focal length $bfl_{23}$ for lens pair $L_3+L_2$ is $bfl_{32}=f_2\times(f_3-s_{23})/(f_2+f_3\times s_{23})$. The back focal length $bfl_{32}$ is defined as the distance from the back surface of lens $L_2$ (the "back surface" of lens $L_2$ is the surface of lens $L_2$ on the $L_1$ side) to the focal point of lens system $L_3+L_2$ along the direction from $L_3$ to $L_2$. If $f_2>0$, $f_3=-m_3\times f_2<0$, where $m_3$ is an integer between 1 and 5, inclusive, and $s_{23}=-m_s\times f_3=m_s\times m_3\times f_2$, where $m_s$ is an integer between 1 and 5, then the back focal length $bfl_{23}=f_2\times(m_3+m_s\times m_3)/(m_3+m_s\times m_3-1)$. Use of integer parameters $m_3$ and $m_s$ here is only for convenience in order to express the values $s_{23}$ and $f_3$ through $f_2$. The integer parameters $m_3$ and $m_s$ can vary in a range to meet different amplification requirements. Taking $m_3=3$ and $m_s=3$, the back focal length would be $bfl_{23}=f_2\times 12/11$, only slightly longer than $f_2$. Thus, according to the above analysis under thin lens approximation, in order to maintain a collimated output light beam $B_3$, only distance $s_{12}$ needs to be fine-tuned. For the first amplification stage 102 to work properly, it is required that the distance from the focal point of lens $L_1$ to the surface of lens $L_2$ be $f_2$ or, equivalently, $s_{12}=f_1+f_2$. For the second amplification stage 104 to work properly, as above analysis shows, the distance from the focal point of lens $L_1$ to the surface of lens $L_2$ must be $bfl_{23}=f_2\times 12/11$, which is $f_2\times 1/11$ larger than the above defined distance $s_{12}$. To ensure that both amplification stages work properly, the distance between lenses $L_1$ and $L_2$ can be adjusted to a new value of $ss_{12}$, so that $ss_{12}=(f_2+f_1)+f_2\times 1/11$. The final result would be that the first amplification stage 102 provides the same amplification factor for beam deflection, with a slight difference from the standard Keplerian telescope in that the output light beam from lens $L_2$ is not exactly a collimated beam, but is slightly converging. The slightly converging light beam $B_2$ from lens $L_2$, after passing through negative lens system $L_3$, becomes accurately collimated. Therefore, the second stage amplification 104, as described above, can provide both appreciable amplification value and a high quality output light beam $B_3$. The closely coupled two-stage amplification lens system ensures that the two conditions can be simultaneously satisfied.

The above data shows that the three-lens system $L_1+L_2+L_3$ can provide a large amplification $A=A_{12}\times A_3\cong(f_2/f_1)\times(s_{23}/f_3)$ and a collimated output beam $B_3$. The maximum output deflection angle can closely approach $\pm 90°$. For example, when the initial deflection angle is $\pm 1°$, $A_3\cong(f_2/f_1)=10$, and $(s_{23}/f_3)=6$, the output deflection angle is $\pm 60°$. Thus, through the above-described two-stage amplification, the maximum output deflection angle can far exceed the capability of classical telescope lens systems.

Figure 3:
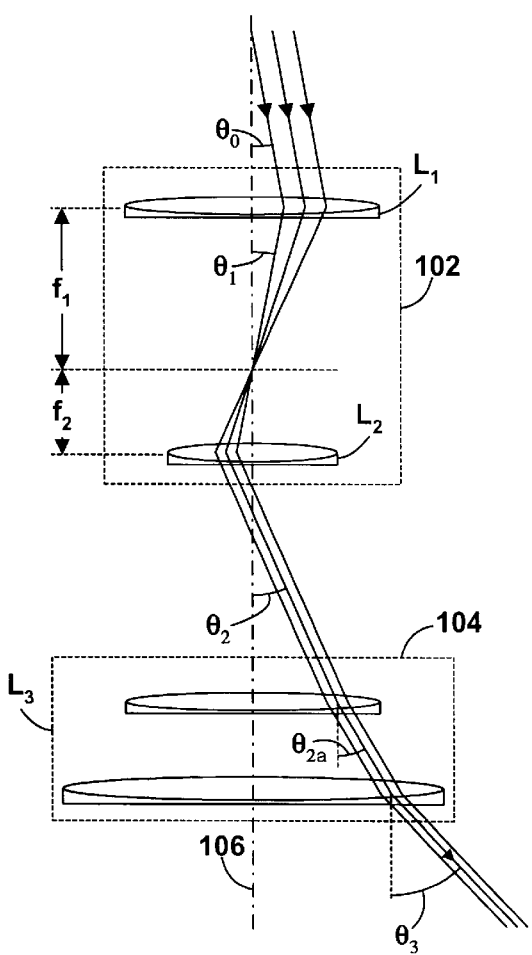
FIG. 3 is a schematic diagram of the embodiment of FIG. 2 with enhancement.

Note that the beam deflection amplifier of FIG. 2 has only a single negative lens $L_3$ coupled with the positive lens $L_2$. This represents only the most basic configuration of the deflection amplifier. In practical systems, a number of lenses can be used as a lens assembly, as long as the basic characteristic of the negative lens is maintained. As described above, the basic characteristic is that, after beam $B_2$ is emitted from lens $L_2$, it does not cross the optical axis more than once. As shown in FIG. 3, the second amplification lens assembly 104 can have more than one negative lens, and can have a number of additional positive lenses to further enhance system performance. The enhancements include providing aberration correction and system optimization. In any case, the correction of aberration and lens system optimization is a higher order approximation that generally does not cause a change of the basic features in the first order approximation. In the final lens system design, the above general feature will be maintained. This is generally true for any lens design.

In addition, by using more than one negative lens with different diameters and different surface curvature located at different distances from lens $L_2$ on the optical axis, an optimized large amplification factor can be provided while at the same time maintaining light beam $B_2$ well within a center area of the lenses in the lens assembly. When using an optimized lens assembly for the second amplifier stage 104, the output deflection angle can closely approach $\pm 90°$.

Note that even though multiple lenses, including multiple positive and negative lenses, can be used as a lens assembly to execute the basic function of lens $L_3$ as described above, in final analysis, according to geometric optics, the whole lens assembly can still be represented by a single negative lens with a focal length $f_3$, located at a distance $sd_{23}$ from lens $L_2$ at the first order of approximation. The above-described amplification formulas will still hold true.

2. Second Beam Deflection Amplifier Embodiment

Figure 4:
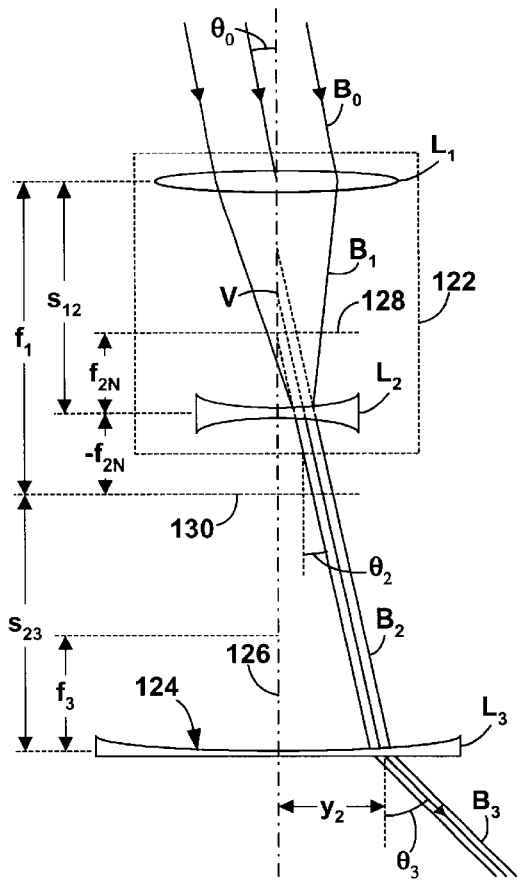
FIG. 4 is a schematic diagram of the second embodiment of the beam deflection amplifier.

The second preferred embodiment of the beam deflection amplifier 16 also comprises two stages of amplification, as shown in FIG. 4. The first amplification stage 122 is essentially a Galilean telescope lens system that also outputs a predeflected light beam with a preamplified deflection angle. The second amplification stage 124 is a negative lens system optically coupled to the first amplification stage 122. As with the first embodiment above, the most important criteria of the present invention for achieving a large output deflection angle at the output of the second amplification stage 124 is to make sure that the light beam $B_2$ always angles away from the optical axis 126. In simple and unified mathematical terms, the slope of the light beam u remains the same or increases relative to the optical axis 126 throughout the second amplification stage 124.

A Galilean lens system comprises essentially a pair of lenses, lens $L_1$ having a positive focal length $f_1>0$ and lens $L_2$ having a negative focal length $f_2<0$, where $f_1>|f_2|$. The two lenses are separated by a distance $s_{12}$ so that $f_1+f_2=s_{12}$. When a collimated light beam with a small deflection angle $\theta_0$ relative to the optical axis 126 is incident on lens $L_1$, the output light beam $B_2$ from lens $L_2$ will have a larger deflection angle $\theta_2$ relative to the optical axis 124, where $\theta_2/\theta_0=f_2/|f_1|>1$. This is an established, well-known method for increasing the deflection angle of a light beam. The limitation of this lens system $L_1+L_2$ is that the maximum output deflection angle cannot be large because the radius $r_2$ of lens $L_2$ must be small. In addition, the light beam must only impinge on a limited central area with a radius $r_c<r_2$, otherwise lens aberrations would be unacceptable relative to that of lens $L_1$. Keeping the light beam inside the area $r_c$ means that the output deflection will be very limited. This corresponds to the same limitation discussed above relative to the Keplerian lens system of the first embodiment. Note that the Galilean lens system intrinsically does not permit insertion of a field lens. Thus, this limitation cannot be overcome and the prior art contains no effective method for improving this limitation. As a result, the Galilean lens system is usually considered inferior to the Keplerian lens system because the maximum deflection angle for a Galilean lens system is less than that of the Keplerian system.

The present invention provides an effective method for significantly improving the maximum deflection angle of the Galilean lens system when used for light beam deflection to meet the requirements of modern optics. The basic method is to add a second stage of amplification. The following shows that a two-stage deflection angle amplifier provides a large output deflection angle with good output beam quality. The basic construction and analysis are the same as those described above for the Keplerian lens system of the first embodiment. The difference is that the positive lens $L_2$ is replaced with a lens $L_{2N}$ having a negative focal length $f_{2N}$, and the corresponding geometric configuration is modified for the negative lens.

Because lens $L_{2N}$ has a negative focal length, its focal plane 128 for forward light beam propagation (from lens $L_1$ to lens $L_{2N}$ to lens $L_3$) is located between lenses $L_1$ and $L_{2N}$. This is also the common focal plane of lens system $L_1+L_{2N}$. Because $f_1 >> |f_{2N}|$, the output light beam $B_2$ from lens $L_2$ is also a narrow beam as in the case of Keplerian system. Since the width of the beam $B_2$ is small, the output beam $B_2$ from lens $L_{2N}$ can be approximately described as a ray that is emitted from the optical axis 124 at point V. The behavior of beam $B_2$ passing through the second stage lens $L_3$ can be calculated by paraxial ray formulae. According to the paraxial approximation, a negative lens with a focal length $f_3$, located at distance $s_{23}$ tends to bend the ray trace outwardly by an additional slope of $\Delta u_{23}=u_3-u_2=\tan(\theta_3)-\tan(\theta_2)=y_2/f_3$, where $y_3$ is the height of the beam $B_2$. Since $y_2=u_3 \times s_{23}$, the amplification factor of the second stage is $A_3=s_{23}/f_3$. As long as the distance $s_{23}$ is sufficiently large and lens $L_3$ is constructed with an appropriately large size, the amplification factor can range from about 2 to about 10, and the output deflection angle can be as large as $\pm 90°$.

In addition to the requirement that the lens system provide amplification, it is also necessary that it provide a collimated light beam output. If beam $B_3$ is a collimated beam, it will diverge from the optical axis 126 because lens $L_3$ is negative. By appropriately choosing the parameters $f_2$, $f_3$, $s_{23}$, and fine-tuning the distance $s_{12}$, all the required performance parameters can be consistently achieved. To show this, consider lens pair $L_3+L_{2N}$ looking from the reverse direction of light propagation, that is, from the output surface of lens $L_3$ along the direction $L_3$ to $L_{2N}$ to $L_1$. When using thin lens approximations, the combined back focal length $bfl_{23}$ for lens pair $L_3+L_{2N}$ is $bfl_{23}=f_2 \times (f_3-s_{23})/(f_2+f_3-s_{23})$. If $f_2>0$, $f_3=-m_3 \times f_2<0$, where $m_3$ is an integer between 1 and 5, inclusive, and $s_{23}=-m_s \times f_3=m_s \times m_3 \times f_2$, where $m_s$ is an integer between 1 and 5, inclusive, then the back focal length $bfl_{23}=f_2 \times (m_3+m_s \times m_3)/(m_3+m_s \times m_3+1)$. The integer parameters $m_3$ and $m_s$ can vary in a broad range to meet different amplification requirements. For example, when $m_3=3$ and $m_s=3$, the back focal length would be $bfl_{23}=f_2 \times 12/13$. Because $f_2<0$, the absolute value $|bfl_{23}|$ is only slightly smaller than $|f_2|$. The back focal length is the distance from the back surface of the back lens to the focal point of the lens system. A negative back focal length represents the fact that the focal plane position is located between lenses $L_{2N}$ and $L_3$ instead of outside of the lens pair. Actually, the above data shows that the focal plane of lens system $L_{2N}+L_3$ is located close to the focal plane 130 of lens $L_1$. Thus, in order to keep the output beam $B_3$ collimated, only a minor change to $s_{12}$ needs to be made that does not significantly affect system parameters. Specifically, $s_{12}$ only needs to be decreased from the original design value $s_{12}=f_2+f_1$, where $f_2<<f_1$, by the amount $1/12 \times f_2$. This small decrease of $s_{12}$ has no significant adverse impact on any other system characteristics.

This analysis shows that the three-lens system $L_1+L_{2N}+L_3$ provides a lens system with a large amplification $A=K_{12} \times K_3 \cong (f_2/f_1) \times (s_{23}/f_3)$ with a collimated output beam.

Note that the beam deflection amplifier as shown in FIG. 4 only has one single negative lens $L_3$ coupled with the positive lens $L_2$. This represents only the most basic configuration of the amplifier. In practical systems, a number of lenses can be used as a lens assembly, as long as the basic characteristic of the negative lens in the second embodiment is maintained. The basic feature of the second amplification stage 124 in the second embodiment is, as described above, after beam $B_2$ is emitted from lens $L_2$, it does not cross the optical axis 126. This differs from the first embodiment, where once beam $B_2$ is emitted from lens $L_2$, it crosses the optical axis only once.

Figure 5:
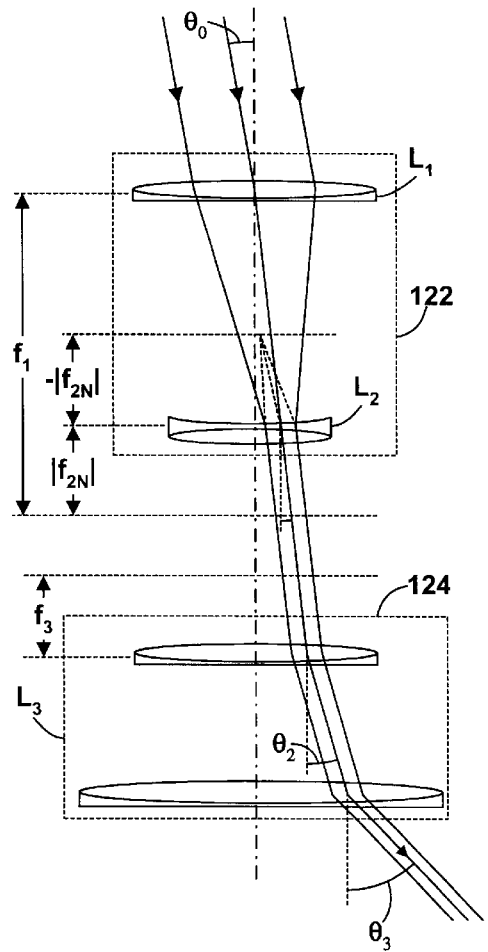
FIG. 5 is a schematic diagram of the embodiment of FIG. 4 with enhancement.

As shown in FIG. 5, the second amplification lens assembly 124 can have more than one negative lens, and can have a number of additional positive lenses to further enhance system performance. The enhancements include providing aberration correction and system optimization. In any case, the correction of aberration and lens system optimization is a higher order approximation that generally does not cause a change of the basic features in the first order approximation. In the final lens system design, the above general feature will be maintained. This is generally true for any lens design.

In addition, by using more than one negative lens with different diameters and different surface curvature located at different distances from lens $L_2$ on the optical axis, an optimized large amplification factor can be provided while at the same time maintaining light beam $B_2$ well within a center area of the lenses in the lens assembly. When using an optimized lens assembly for the second amplifier stage 104, the output deflection angle can closely approach $\pm 90°$.

Note that even though multiple lenses, including multiple positive and negative lenses, can be used as a lens assembly to execute the basic function of lens $L_3$ as described above, in final analysis, according to geometric optics, the whole lens assembly can still be represented by a single negative lens with a focal length $f_3$, located at a distance $sd_{23}$ from lens $L_2$ at the first order of approximation. The above-described amplification formulas will still hold true.

Note that the present invention contemplates some variations to the above described embodiments based on standard practices with optical devices. Generally, in an optical system designed for executing a specific function, accessory optical components may be inserted in order the enhance system performance without changing the basic function of the system. These accessories can include, for example, mirrors, prisms, beam splitters, field lenses, relay lenses, coatings, etc.

In the English language, a lens can be interpreted either as a single element, or a combination of multiple elements, any lens system can have a number of interpretations through different arbitrary recombinations of elements. Thus, any arbitrary recombination of elements of the above-described embodiments containing the essential structural features as described above are contemplated by the present invention.

Note that some prior art lens systems use a negative lens for an output element or an input element. However, because the function of the systems are essentially different from that of the present invention, the system structures are essentially different. For example, in some wide angle camera imaging lenses, a negative lens is used as an outer lens facing the image subject. However, the function of the camera imaging lens is different than the function for light beam deflection (see Modern Lens Design, by W. J. Smith, 1992, p.355).

A second example is the negative lens is used in projection lens system. The function of a projection lens system is to project an entire image to a screen, which is close to an imaging system (see Modern Lens Design, by W. J. Smith, 1992, p.365, and U.S. Pat. No. 4,348,081). The function of projection lens is essentially different from light beam deflection.

The third example of prior art is an inverse Galilean security viewer (see Handbook of Optics, ed. M. Bass, 1995, Volume II, p2.15 and U.S. Pat. No. 2,234,716). The lens system uses a negative lens as an outside input lens for transmitting the light emitted from the outside subject into the human eye.

The above mentioned three lens systems are substantially different from the present invention. (1) None of these lens systems has an initial deflector which dynamically controls the direction of deflection of light propagation. (2) These lens systems are essentially static imaging systems, having a finite focal length. The subject and the image both must have a finite distance to the lens system. On the other hand, the present invention deals with an essentially collimated light beam, that is, an essentially collimated light beam in and an essentially collimated light beam out. Thus, the lens system of the present invention is an "afocal system" according to standard definition. (3) The light propagation direction in the imaging lens system and in the security viewer lens system are opposite to that in the present invention.

Thus it has been shown and described a light beam deflection amplifier which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A light beam deflector adapted for deflecting a source light beam emitted from a light source, said deflector having an optical axis and comprising:

(a) in physical order, an initial beam deflector and a beam deflection amplifier;

(b) said initial beam deflector receiving said source light beam and emitting an initially deflected light beam at an initial deflection angle $\theta_0$;

(c) said beam deflection amplifier including, in physical order, a first amplification stage and a second amplification stage;

(d) said first amplification stage receiving said initially deflected light beam and transmitting a predeflected light beam at a preamplified deflection angle, said first amplification stage being selected from the group consisting of a Keplerian lens system and a Galilean lens system; and (e) said second amplification stage receiving said predeflected light beam and transmitting a fully deflected light beam at a full deflection angle $\theta=A\theta_0$, where $A>1$, said second amplification stage including a negative lens.

2. The light beam deflection amplifier of claim 1 wherein said first amplification stage is a Keplerian lens system and wherein said light beam crosses said optical axis only once between said first amplification stage and said second amplification stage and does not cross said optical axis after exiting from said second amplification stage.

3. The light beam deflection amplifier of claim 1 wherein said first amplification stage is a Galilean lens system and wherein said light beam does not cross said optical axis after exiting from said first amplification stage.

4. The light beam deflection amplifier of claim 1 wherein said amplification factor A is a constant.

5. The light beam deflection amplifier of claim 1 wherein said amplification factor A is a function of said initial deflection angle $\theta_0$.

* * * * *